United States Patent [19]

Yasutake et al.

[11] 4,094,058

[45] June 13, 1978

[54] METHOD OF MANUFACTURE OF LIQUID CRYSTAL DISPLAYS

[75] Inventors: Akira Yasutake; Shigemitsu Kiso, both of Kyoto, Japan

[73] Assignee: Omron Tateisi Electronics Co., Kyoto, Japan

[21] Appl. No.: 708,027

[22] Filed: Jul. 23, 1976

[51] Int. Cl.² .............................................. G02F 1/13
[52] U.S. Cl. .................................. 29/592 R; 29/412; 350/330
[58] Field of Search ................. 29/592, 412, 414, 417, 29/DIG. 33; 350/160 LC

[56] References Cited

U.S. PATENT DOCUMENTS

| | | | |
|---|---|---|---|
| 3,647,958 | 3/1972 | Sobel | 350/160 LC UX |
| 3,750,139 | 7/1973 | Blishak | 350/160 LC X |
| 3,862,360 | 1/1975 | Dill et al. | 350/160 LC X |

Primary Examiner—Victor A. DiPalma
Attorney, Agent, or Firm—Flehr, Hohbach, Test, Albritton & Herbert

[57] ABSTRACT

A liquid crystal display assembly including a plurality of individual liquid crystal displays formed on a pair of cooperating substrates with the displays isolated from one another by a sealing pattern served to define individual displays. One method of forming a plurality of liquid crystal displays includes the steps of applying a conductive pattern to one surface each of a pair of substrates, the pattern cooperating when the substrates are face to face to form the plurality of displays, providing sealing means on at least one of the surfaces prior to bringing said surfaces together and in a pattern isolating each of the plurality of displays to form a plurality of displays cells, filling the cells with liquid crystal material, sealing the cells by bringing the substrates together and cutting substrates to form the displays.

9 Claims, 10 Drawing Figures

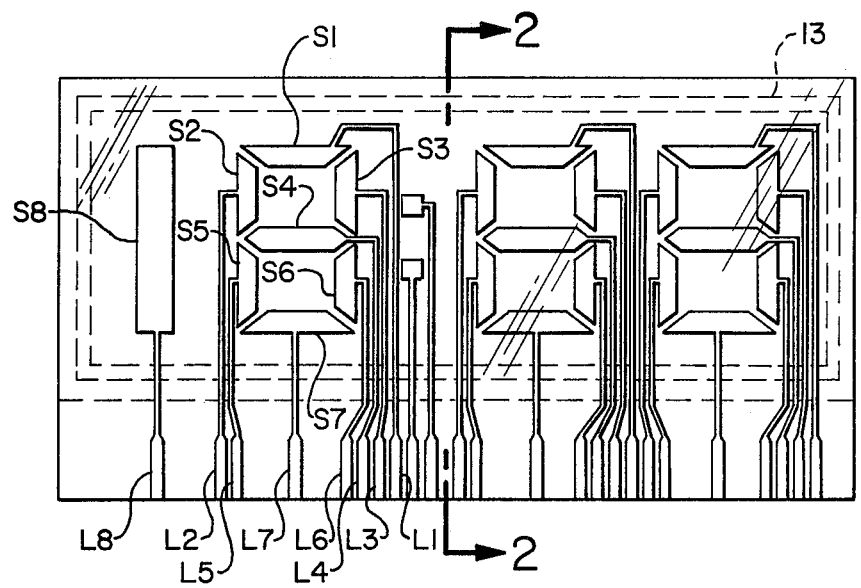
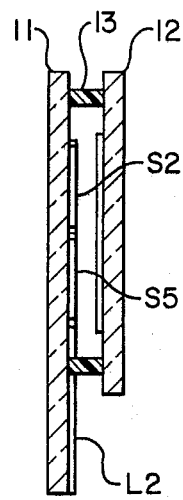
FIG.-1
FIG.-2
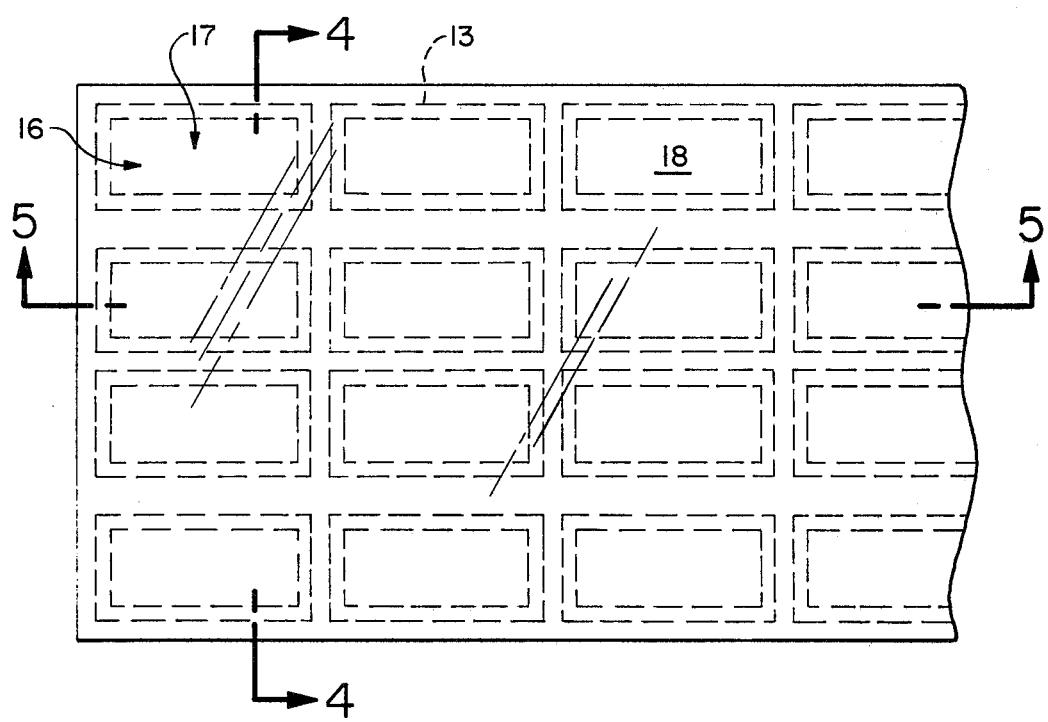
FIG.-3

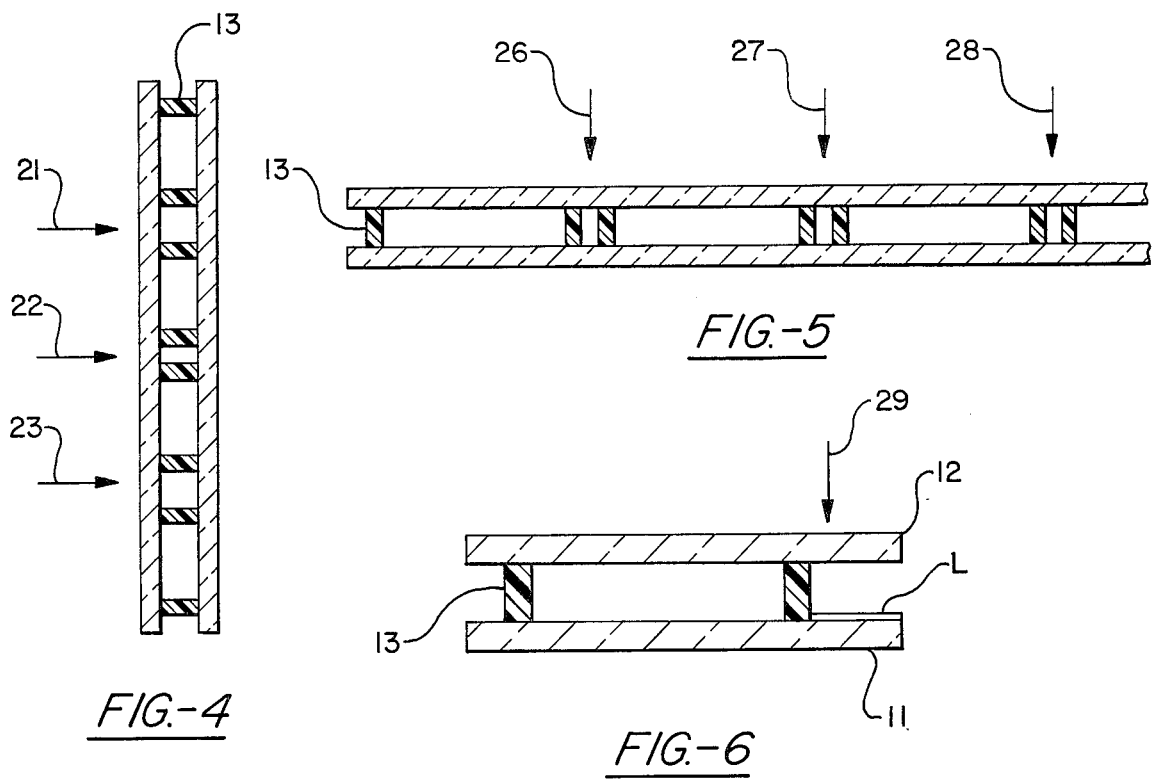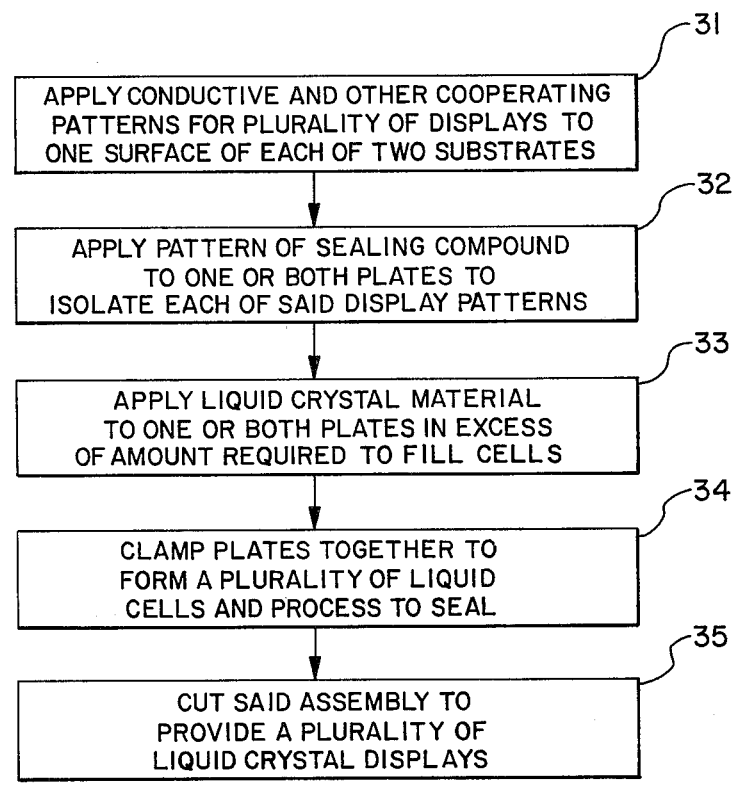

METHOD OF MANUFACTURE OF LIQUID CRYSTAL DISPLAYS

BACKGROUND OF THE INVENTION

This invention relates generally to liquid crystal displays and more particularly to a plural liquid display assembly and method.

A typical liquid crystal display device comprises a pair of spaced apart substrates which include a seal therebetween defining a cell adapted to hold the liquid crystal material. Each of the substrates has its inner surface provided with a conductive electrode pattern. The patterns on the two substrates cooperate with one another whereby when an electric field is applied, the liquid crystal material is selectively activated to either become dispersive or to change polarization whereby a display of the activated portions can be obtained. By suitable design of the electrodes, numeric and other patterns can be formed responsive to application of voltages. Uses for such displays are in watches, electronic calculators and measuring instruments for display of numeric information.

It is the present practice to individually process each liquid crystal display device. That is, the substrate for the displays is processed to form the cooperating pattern, the individual substrates are assembled and sealed and the cell is filled with liquid crystal material. Individual handling of each display is time-consuming and consequently makes the manufacture of displays expensive.

OBJECTS AND SUMMARY OF INVENTION

It is a general object of the present invention to provide a liquid crystal display assembly including a plurality of individual displays.

It is another object of the present invention to provide a method for forming a plurality of liquid crystal displays employing a number of common process steps.

It is another object of the present invention to provide an efficient and economical method for the manufacture of liquid crystal displays.

In accordance with the invention, there is provided a liquid crystal display assembly comprising a front substrate, a rear substrate and a plurality of conductive cooperating patterns between said front and back substrates to define or form a plurality of individual displays. A sealing material is disposed between said front and rear substrates to isolate each of said plurality of displays. A liquid crystal material fills the space between said front and rear substrates in said cells to form a plurality of liquid crystal displays. A method of forming a plurality of liquid crystal displays in which a number of processing steps are common to the plurality of displays.

BRIEF DESCRIPTION OF THE DRAWINGS

FIG. 1 is a front elevational view of a typical liquid crystal display with the conductive electrodes shown.

FIG. 2 is a sectional view taken along the lines 2—2 of FIG. 1 showing the front and back substrates together with the conductive patterns on the front and back substrates.

FIG. 3 shows a liquid crystal display assembly in accordance with the present invention and including a plurality of liquid crystal display cells formed between a single pair of substrates.

FIG. 4 is a sectional view taken along the line 4—4 of FIG. 3.

FIG. 5 is a sectional view taken along the line 5—5 of FIG. 3.

FIGS. 6 and 7 are enlarged side elevational views of a liquid crystal display after a cutting operation showing locations for further operations.

FIG. 8 shows the process steps in forming the individual liquid crystal displays in accordance with one embodiment of the invention.

DESCRIPTION OF PREFERRED EMBODIMENTS

Figure 7:
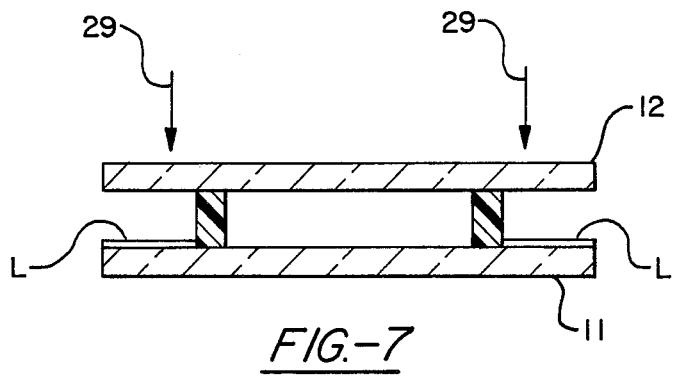

Referring now to FIGS. 1 and 2, there is shown a conventional liquid crystal display for use in connection with a wristwatch or clock. The display shown includes a first transparent non-conductive substrate 11 spaced from a rear non-conductive substrate 12. The substrates 11 and 12 may, for example, be made of glass or other suitable transparent non-conductive material. The substrate 12 in the reflective mode of operation of the liquid crystal device may be transparent or opaque, whereas for the transmissive mode of operation the rear substrate is transparent. The substrates include an inner conductive electrode pattern which cooperate with one another to provide an electric field between them. A cell is formed by providing a seal 13 surrounding the numerical display and forming a sealed chamber or cell in which suitable liquid crystal material is disposed. The seal may be formed of plastic, structural glue, dielectric material, resin material, epoxy or other material suitable for forming a hermetic seal defining the cell. The liquid crystal material filling the cell may be of any of the well-known types of liquid crystal material which operates either in the scattering or in the polarizing mode.

In the illustrative example shown, the electrode pattern includes three numerals formed of seven segments S1 through S7. The segment electrodes can be individually energized via leads L1 through L7 to form any one of the numerals 0 through 9. The numeral 1 includes a single segment S8 with lead L8. The display is energized to provide the time between 0:00 to 12:59. The electrodes may be made of a transparent conductive material such as indium oxide or tin oxide provided either by masking and sputtering by application of conductive material over the entire surface and then suitably masking and etching, or by other well known processes such as printing. The front surface of the rear substrate 12 may include a reflective coating of material such as aluminum or silver which reflects ambient light and operates in the reflective mode. On the other hand, the rear electrode may be transparent and the back surface illuminated whereby to operate in the transmissive mode. Fabrication and operation of liquid crystal displays of the above types is well known and no further detail regarding the same is set forth in this application.

The conventional way of making liquid crystal displays, of course, requires the handling of each individual substrate for the various processing steps and for the sealing steps thereby resulting in a time-consuming, expensive procedure. In accordance with the present invention, a plurality of liquid crystal displays are formed in an assembly whereby certain processing steps are common to all of the displays. The front substrate is provided with the multiple conductive electrodes for a plurality of displays in a single processing step such as sputtering, printing, etc. Similarly, the back substrate is provided with its pattern for a plurality of displays. The displays may be arranged in rows 16 and columns 17 as shown in FIG. 3. After the front and back substrates have been provided with the conductive patterns, the sealing material is applied to one or both of the substrates in a pattern such as shown by the dotted lines 13 whereby to define a plurality of cells 18, one for each of the displays forming the rows and columns. Referring more particularly to the sectional view, FIGS. 4 and 5, the material which seals and defines the various cells is illustrated. The sealing material may be glue, plastic or other known sealant. In accordance with one embodiment of the invention, after the sealing pattern has been applied to one or both substrates, a liquid crystal material is applied to the complete surface of one or both substrates and the two substrates are brought together in face to face relationship whereby excessive liquid crystal material is squeezed out and each of the cells 18 is formed and filled with liquid crystal material. Then, by suitable application of pressure, and heat if required, the assembly is sealed to form a hermetic seal around each of the liquid crystal displays 18. Thus, there is formed a liquid crystal display assembly including a plurality of liquid crystal displays arranged in a pattern.

Referring to FIG. 4, the next step in forming individual displays is to cut longitudinal strips by cutting between the rows such as shown by the arrows 21, 22 and 23. The cuts 21, 22 and 23 are between two rows of liquid crystal displays having extending substrate. The outwardly extending substrate will contain and expose the leads which connect to the patterned electrodes in the cell. The next step can either be to divide the individual cells in the row by cutting along the lines 26, 27 and 28 as shown in FIG. 5 to form individual cells. The substrate 12 is then cut off as shown at 29, FIG. 6, to expose the extended portion of the substrate 11 which contains the leads L for connection to external equipment. In the alternative, the step shown in FIG. 6 by the cut 29 may be performed in two steps. One, scribe lines may be formed while the various cells are still assembled in a row and after the cuts 26, 27 and 28, the extending portions removed at the scribe marks by bending, heating, etc. The cutting equipment and method for the cut 29 will depend upon the type of substrate which is used. If the substrate is glass, the cutting may be with a diamond saw, by heated wire, by scribing and other known methods of cutting glass. For other materials, suitable known cutting techniques may be employed.

In certain displays the leads L may extend from both edges as shown in FIG. 7. Then the cut 29 exposes two sets of leads, as shown in FIG. 7. It is apparent that the cut 29 as shown in FIG. 7 may be performed to make a desirable shape for each cell even if the substrate 11 does not include leads on both sides.

In any event, it is seen that the steps of forming the conductive patterns on the surface of the substrates and forming the dividing seal to define a plurality of cells is common to all cells, as are the steps of filling and sealing the cells. Thereafter, the cutting or dividing step is common to a number of cells.

FIG. 8 shows the process steps. The steps include applying the conductive or other cooperating patterns for a plurality of displays to one surface of each of the two substrates, 31. The next step is to apply a pattern of sealing compound to one or both substrates to form cells 32. The next step is to apply a liquid crystal material to one or both plates in excess of the amount required to fill the cells 33. The next step is to clamp the plates together to form or define a plurality of cells filled with liquid material and to process the assembly to adequately seal the individual cells 34. The final steps are to cut or dice said assembly to provide the plurality of liquid crystal displays, 35.

Figure 9:
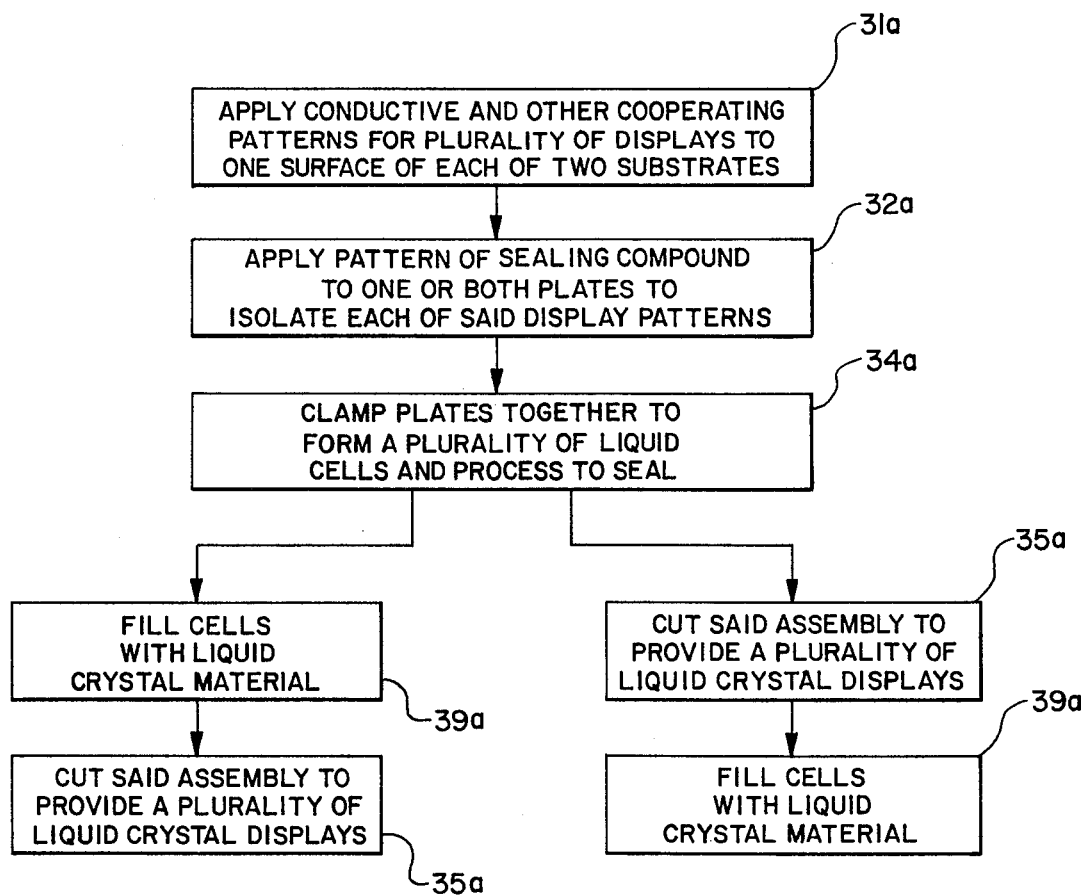
FIG. 9 shows the process steps in forming the individual liquid crystal displays in accordance with another embodiment of the invention.
Figure 10:
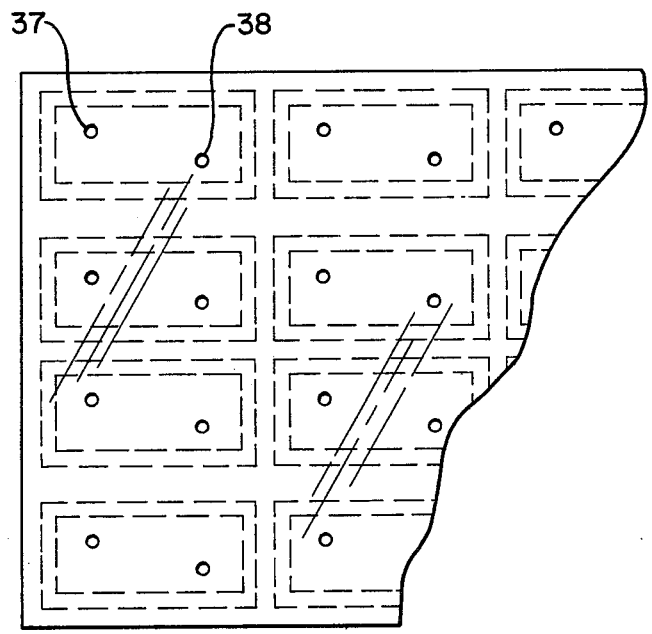
FIG. 10 shows a liquid crystal display assembly in accordance with another embodiment of the invention.

The sealing material may be glass frit. If the melting point of the glass frit is too high for the liquid crystal material used the displays are filled with the liquid crystal material after the individual cells are formed. Thus, the procedure is as indicated in FIG. 9 and comprises the steps of applying the conductive and other cooperating patterns for a plurality of displays to one surface of each of a plurality of displays and to one surface of each of two substrates 31a. The next step is applying a pattern of sealing glass frit to one or both surfaces to define cells 32a. The next step is clamping the substrates together and processing to seal and form individual cells, 34a. In accordance with this embodiment of the invention, FIGS. 9 and 10, one of the substrates may include one or two holes 37 and 38 as shown in FIG. 10. The hole or holes communicate with each of the display cells. Alternatively the seal may include an opening or hole which communicates with each cell. The next step is to fill the cells with liquid material as indicated by box 39a in FIG. 9. The display is then diced or cut through the holes as indicated by box 35a in FIG. 9. Alternatively the dicing and cutting may precede the filling operation. The cells may be filled by injecting liquid crystal material or by submerging the cells in liquid and allowing the material to fill the cells. After filling the cells the fill holes are suitably sealed as by cementing. The procedure just described with respect to FIGS. 9 and 10 may be employed in connection with seal forming material other than glass frit.

Thus, it is seen that there is provided an improved process for forming liquid crystal displays in which a number of the steps are common to a plurality of displays.

We claim:

1. The method of forming a plurality of individual crystal displays which comprises the steps of applying a conductive pattern to one surface each of a pair of substrates, said pattern cooperating when the substrates are face to face to form said plurality of displays, providing sealing means on at least one of said surfaces prior to bringing said surfaces together and in a pattern isolating each of said plurality of displays to form a plurality of display cells, filling said cells with liquid crystal material, sealing said cells by bringing said substrates together and cutting said substrates to form said displays.

2. The method as in claim 1 in which said cells are filled and sealed prior to cutting said substrates.

3. The method as in claim 1 in which said cells are filled after cutting said substrate.

4. The method as in claim 1 including the additonal step of removing a portion of one of said substrates which extends beyond the seal to expose the portion of the opposite substrate which extends beyond the seal.

5. The method as in claim 1 wherein the conductive pattern on at least one of said substrates extends beyond the seal to expose the lead pattern for connection thereto.

6. The method of forming a plurality of individual liquid crystal displays which comprises the steps of applying a conductive pattern to one surface of each of a pair of substrates, said patterns cooperating to form a plurality of displays when the substrates are face to face, applying a pattern of sealing compound to at least one of said substrates to isolate each of said displays and form individual cells, applying liquid crystal material to at least one of said substrates in excess of the amount required to fill the cells, bringing the substrates together and sealing them together with said sealing compound to form said plurality of individual displays having front and rear substrates filled with a liquid crystal material, and cutting said assembly to provide a plurality of individual liquid crystal displays.

7. The method as in claim 6 wherein the conductive pattern at least on one of said substrates includes portions extending outside the cells and including the step of removing the extending portion of the other substrate to expose the lead pattern on the one substrate for connection thereto.

8. The method as in claim 1 in which said cells are filled with said liquid crystal material prior to the sealing of said cells with said sealing means.

9. The method as in claim 1 in which said cells are filled with said liquid crystal material after the sealing of said cells with said sealing material.

* * * * *